US008664139B2

(12) United States Patent
Lee et al.

(10) Patent No.: US 8,664,139 B2
(45) Date of Patent: Mar. 4, 2014

(54) DESULFURIZATION METHOD FOR LNT SYSTEM

(75) Inventors: Jin Ha Lee, Seoul (KR); Jae Beom Park, Seoul (KR); Jeong Ho Kim, Gunpo-si (KR); Jin Woo Park, Suwon (KR); Soon Hyung Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 251 days.

(21) Appl. No.: 13/315,003

(22) Filed: Dec. 8, 2011

(65) Prior Publication Data

US 2013/0040802 A1 Feb. 14, 2013

(30) Foreign Application Priority Data

Aug. 12, 2011 (KR) ........................ 10-2011-0080718

(51) Int. Cl.
*B01J 38/14* (2006.01)

(52) U.S. Cl.
USPC ............................................... 502/56; 502/52

(58) Field of Classification Search
USPC ............................................... 502/56, 38, 52
See application file for complete search history.

(56) References Cited

FOREIGN PATENT DOCUMENTS

| | | | |
|---|---|---|---|
| JP | 2005-133721 | A | 5/2005 |
| JP | 2010-127179 | A | 6/2010 |
| JP | 4531533 | B2 | 6/2010 |
| KR | 10-0901603 | B1 | 6/2009 |
| KR | 10-0906876 | B1 | 7/2009 |

*Primary Examiner* — Edward Johnson

(74) *Attorney, Agent, or Firm* — Morgan, Lewis & Bockius LLP

(57) ABSTRACT

A desulfurization method of a nitrogen oxide absorption catalyst when diesel is used may include determining how many times a regeneration of a diesel particulate filter (DPF) is completed, ending a DPF regeneration, if the number of times of the DPF regeneration reaches a predetermined value and entering into a desulfurization mode to desulfurize the DPF, ending the desulfurization mode after the desulfurization mode is performed for a predetermined time, and calculating a particulate matters (PM) amount that is trapped in the DPF after the desulfurization, compensating the trapped PM amount, and determining a time of the DPF regeneration. A desulfurization timing is determined based on the number of times that the DPF is regenerated to be able to simplify the desulfurization logic and also reduce the memory of ECU, when the LNT catalyst is poisoned by a small amount of sulfur included in exhaust gas.

8 Claims, 2 Drawing Sheets

DESULFURIZATION METHOD FOR LNT SYSTEM

CROSS-REFERENCE TO RELATED APPLICATION

This application claims priority to and the benefit of Korean Patent Application No. 10-2011-0080718 filed Aug. 12, 2011, the entire contents of which application is incorporated herein for all purposes by this reference.

BACKGROUND OF INVENTION

1. Field of Invention

The present invention relates to a desulfurization method of a nitrogen oxide absorption catalyst system. More particularly, the present invention relates to a desulfurization method of a nitrogen oxide absorption catalyst system that is poisoned by sulfur that is included in a diesel fuel.

2. Description of Related Art

Generally, a Lean NOx Trap (LNT) of a diesel engine absorbs NOx of exhaust gas in a condition and uses a rich condition of fuel to reduce NOx to N2 and O2 when the abosorbed NOx reaches a maximum capacity.

The LNT catalyst is poisoned by sulfur element included in the fuel and the performance thereof is deteriorated. The engine driving condition is varied so as to eliminate the poisoned sulfur of the LNT, wherein the exhaust gas is heated and simultaneously the real air/fuel ratio is adjusted. The real air/fuel ratio is adjusted to raise the temperature of the exhaust gas.

A conventional desulfurization method in a LNT system using a high sulfur diesel fuel calculates SOx amount of the LNT catalyst, determines a deterioration rate of the LNT catalyst according to the SOx amount, and determines the desulfurization timing.

Particularly, when the high sulfur diesel fuel having at least 100 ppm sulfur is used, the LNT catalyst is poisoned by the sulfur of the diesel fuel and the purification rate for NOx is deteriorated.

Here, the sulfur amount that is poisoned in the LNT and the sulfur amount that is slipped from the LNT are determined, and the desulfurization method is not simple, because the desulfurization control is operated by considering the particulate matters (PM) trapping condition of a diesel particulate filter (DPF).

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method having advantages of desulfurizing the catalyst with simple process.

Also, various aspects of the present invention provide for a desulfurization method having advantages of reducing ECU memory related to a desulfurization mode.

A desulfurization method of a nitrogen oxide absorption catalyst when diesel is used according to various aspects of the present invention may include determining how many times a regeneration of a diesel particulate filter (DPF) is completed, ending a DPF regeneration, if the number of times of the DPF regeneration reaches a predetermined value and entering into a desulfurization mode to desulfurize the DPF, ending the desulfurization mode after the desulfurization mode is performed for a predetermined time, and calculating a particulate matters (PM) amount that is trapped in the DPF after the desulfurization, compensating the trapped PM amount, and determining a time of the DPF regeneration.

The desulfurization method may further include comparing the temperature (T) inside the nitrogen oxide absorption catalyst with the degradation temperature (X) of the nitrogen oxide absorption catalyst.

If the inside temperature (T) of the nitrogen oxide absorption catalyst may be lower than the degradation temperature (X), it may be determined whether the desulfurization is performed for a predetermined time, and if the inside temperature (T) of the nitrogen oxide absorption catalyst may be higher than the degradation temperature (X), a drive mode may be transformed to a general lean drive mode.

After the mode may be transformed to the general lean drive mode, the inside temperature (T) of the nitrogen oxide absorption catalyst may be compared with a predetermined temperature (Y), if the predetermined temperature (Y) may be higher than the inside temperature (T), a drive mode may enter into the desulfurization mode, and if the predetermined temperature (Y) may be lower than the inside temperature (T), the general lean drive mode may be continued.

A lamda value in the desulfurization mode may be lower than a predetermined value.

Various aspects of the present invention determines a desulfurization timing based on the number of times that the DPF is regenerated to be able to simplify the desulfurization logic and also reduce the memory of ECU, when a Lean NOx Trap (LNT) catalyst is poisoned by a small amount of sulfur included in exhaust gas.

Also, fuel consumption efficiency is improved by preventing the deterioration of the purification performance caused by the sulfur poisoning.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In a desulfurization method of a nitrogen oxide absorption catalyst system according to various embodiments of the present invention, when ultra low sulfur diesel fuel is used, it can be assumed that the sulfur of the diesel fuel is trapped in the LNT catalyst, and if the number of times that a diesel particulate filter (DPF) is regenerated reaches a predetermined value, the DPF is desulfurized right after regenerating the DPF.

The ultra low sulfur diesel denotes a fuel that the sulfur thereof is less 10 ppm in various embodiments of the present invention, and the sulfur of the diesel fuel is poisoned (trapped) in the LNT catalyst.

Figure 2:
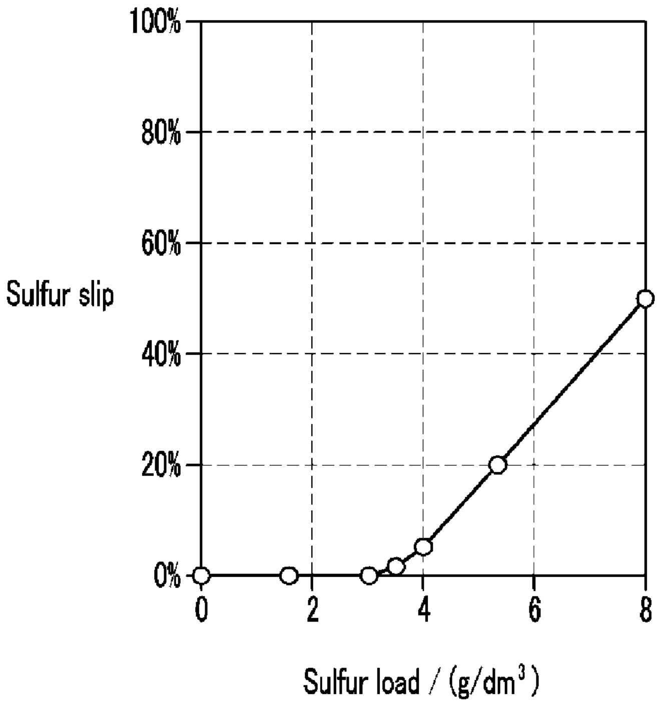
FIG. 2 is a graph showing an exemplary slip threshold of sulfur ingredient in exhaust gas according to the sulfur poisoning amount of a Lean NOx Trap (LNT) catalyst.

FIG. 2 is a graph showing a slip threshold of sulfur ingredient in exhaust gas according to the sulfur poisoning amount of the LNT catalyst, and it can be known that as the sulfur poisoning amount is increased, the ratio of the sulfur that is slipped from the LNT is increased. Particularly, while the sulfur poison amount is small in the LNT, the sulfur ingredient is not slipped therefrom, i.e., the sulfur of the exhaust gas is all trapped in the LNT catalyst. When the ultra low sulfur diesel fuel is used, the sulfur is all trapped in the LNT system and is not be slipped from the LNT catalyst according to various embodiments of the present invention.

A diesel particulate filter (DPF) and a nitrogen oxide absorption catalyst (LNT, Lean NOx trap) are sequentially disposed on an exhaust pipe of a diesel engine to eliminate particulate matters (PM) and nitrogen oxide included in exhaust gas.

Figure 1:
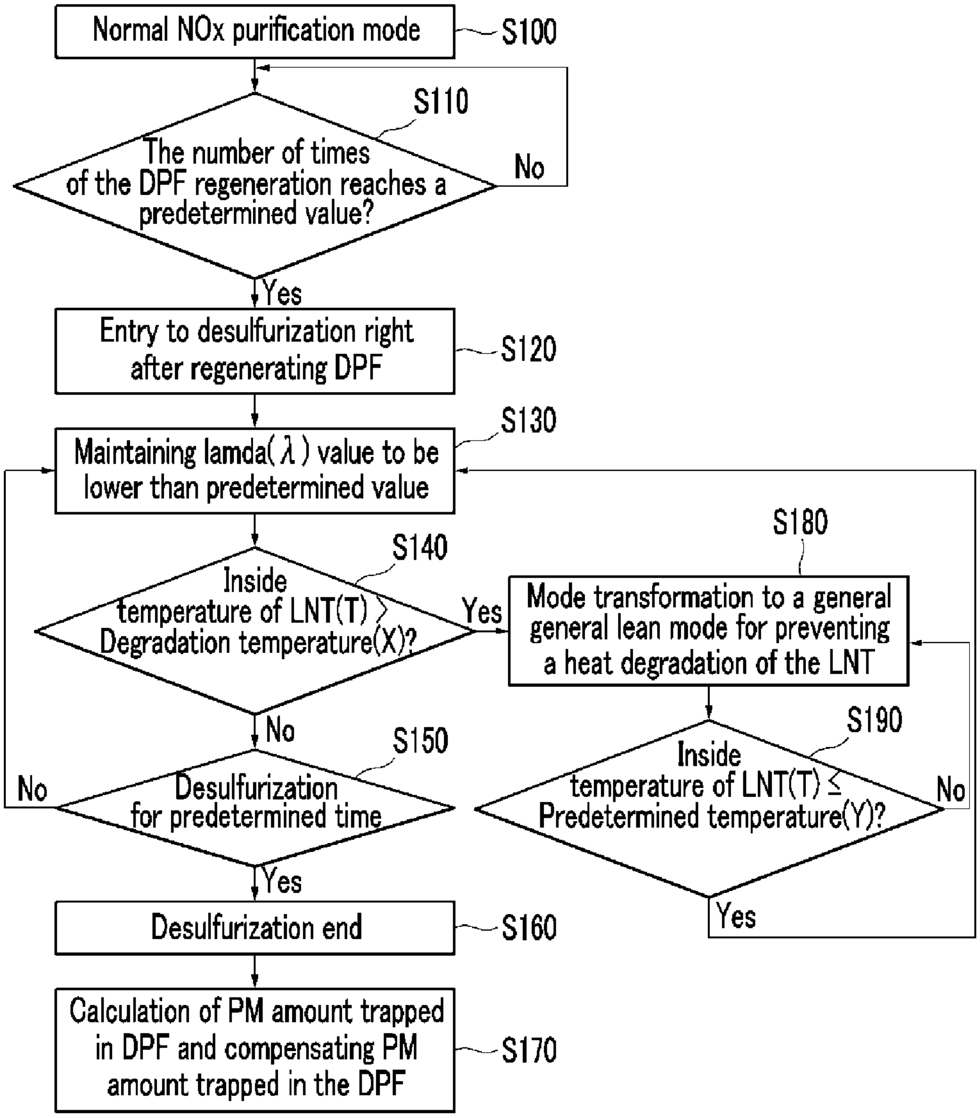
FIG. 1 is a flowchart for an exemplary desulfurization regeneration according to the present invention.

FIG. 1 is a flowchart for desulfurization regeneration according to various embodiments of the present invention, as shown in FIG. 1, wherein a nitrogen oxide purification mode is started in a S100 according to various embodiments of the present invention.

If a particulate matters (PM) of the exhaust gas is trapped by the DPF for a predetermined time, the performance of the DPF is deteriorated, the DPF is regenerated so as to improve the purification performance thereof, it is determined whether the number of times that the DPF is regenerated reaches a predetermined value in a S110, and if the number of times reaches the predetermined value, the system enters into a desulfurization mode right after ending the regeneration of the DPF in a S120.

A real air/fuel ratio to a ideal air/fuel ratio is called a lamda value (λ) or an air excess ratio, when the lamda value (λ) is larger than 1, the real air/fuel ratio is leaner than the ideal air/fuel ratio, and when the lamda value (λ) is less than 1, the real air/fuel ratio is richer than the ideal air/fuel ratio.

The desulfurization mode is performed right after the regeneration of the DPF, wherein the lamda value is to be maintained below a predetermined value to perform the desulfurization mode in a S130, e.g., the lamda value (λ) is maintained below 0.95. The desulfurization is performed in a range of 600-700° C., wherein the fuel ratio to air is controlled to be rich so as to maintain the temperature.

However, the LNT system is deteriorated by a high temperature, i.e., higher than 700° C. Accordingly, the engine control unit (ECU) controls the fuel ratio to be alternately rich and lean such that the temperature of the exhaust gas does not exceed the degradation temperature.

I.e., an inside temperature (T) of the LNT catalyst is compared to a degradation temperature (X) of the LNT catalyst in a S140, if the inside temperature (T) of the LNT catalyst is higher than the degradation temperature (X), the rich mode is transformed to a general lean mode in a S180.

However, when the inside temperature (T) of the LNT catalyst is lower than the degradation temperature (X), it is determined whether the desulfurization mode is continued for a predetermined time in a S150, if the desulfurization mode is completed, the desulfurization is ended in a S160 and the mode is transformed to a general mode, and if the desulfurization is not completed, it is returned to the S130 such that the real air/fuel ratio becomes rich.

If the fuel ratio is controlled to be lean in the S180, the temperature of the LNT catalyst can be lowered less than a desulfurization temperature, the inside temperature of the LNT catalyst is compared to a predetermined temperature (Y) in a S190, if the inside temperature (T) of the LNT catalyst is less than a predetermined temperature (Y), it is determined that the LNT is not desulfuized and it is returned to a S130 so as to raise the temperature. However, when the inside temperature (T) is higher than a predetermined, it is returned to a S180 to lower the temperature thereof. I.e., the lean mode is performed until the inside temperature (T) of the LNT catalyst is lowered to a predetermined temperature (Y).

If the desulfurization is completed by the above processes, the PM amount that is trapped in the DPF is calculated to compensate this in a S170.

The compensated value is used to determine the timing for regenerating the DPF.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A desulfurization method of a nitrogen oxide absorption catalyst when diesel is used, comprising:

determining how many times a regeneration of a diesel particulate filter (DPF) is completed;

ending a DPF regeneration, if the number of times of the DPF regeneration reaches a predetermined value and entering into a desulfurization mode to desulfurize the DPF;

ending the desulfurization mode after the desulfurization mode is performed for a predetermined time; and calculating a particulate matters (PM) amount that is trapped in the DPF after the desulfurization, compensating the trapped PM amount, and determining a time of the DPF regeneration.

2. The desulfurization method of a nitrogen oxide absorption catalyst of claim 1, further comprising comparing an inside temperature (T) inside the nitrogen oxide absorption catalyst with a degradation temperature (X) of the nitrogen oxide absorption catalyst.

3. The desulfurization method of a nitrogen oxide absorption catalyst of claim 2, wherein if the inside temperature (T) of the nitrogen oxide absorption catalyst is lower than the degradation temperature (X), it is determined whether the desulfurization is performed for a predetermined time, and if the inside temperature (T) of the nitrogen oxide absorption catalyst is higher than the degradation temperature (X), a drive mode is transformed to a general lean drive mode.

4. The desulfurization method of a nitrogen oxide absorption catalyst of claim 3, wherein after the mode is transformed to the general lean drive mode, the inside temperature (T) of the nitrogen oxide absorption catalyst is compared with a predetermined temperature (Y), if the predetermined temperature (Y) is higher than the inside temperature (T), the drive mode enters into the desulfurization mode, and if the predetermined temperature (Y) is lower than the inside temperature (T), the general lean drive mode is continued.

5. The desulfurization method of a nitrogen oxide absorption catalyst of claim 1, wherein a lamda value in the desulfurization mode is lower than a predetermined value.

6. The desulfurization method of a nitrogen oxide absorption catalyst of claim 2, wherein a lamda value in the desulfurization mode is lower than a predetermined value.

7. The desulfurization method of a nitrogen oxide absorption catalyst of claim 3, wherein a lamda value in the desulfurization mode is lower than a predetermined value.

8. The desulfurization method of a nitrogen oxide absorption catalyst of claim 4, wherein a lamda value in the desulfurization mode is lower than a predetermined value.

* * * * *